United States Patent [19]

Maekawa et al.

[11] 3,888,689
[45] June 10, 1975

[54] AQUEOUS PRINTING INK CONTAINING PERFUME-CONTAINING MICROCAPSULES

[75] Inventors: Yukio Maekawa; Shizuo Miyano; Kenichiro Yazawa; Asaji Kondo, all of Asaka, Japan

[73] Assignee: Fuji Photo Film Co., Ltd., Kanagawa, Japan

[22] Filed: Oct. 1, 1971

[21] Appl. No.: 185,492

[30] Foreign Application Priority Data

Oct. 1, 1970 Japan.................................. 45-86239

[52] U.S. Cl........ 106/24; 260/29.6 B; 260/29.6 HN
[51] Int. Cl... C09d 11/04; C09d 11/14; C08f 45/24
[58] Field of Search .............................. 106/19–32, 106/14.5; 260/29.6

[56] References Cited
UNITED STATES PATENTS

| | | | |
|---|---|---|---|
| 1,816,978 | 8/1931 | Knight | 106/24 |
| 2,800,457 | 7/1957 | Green et al. | 106/14.5 |
| 3,016,308 | 1/1962 | Macaulay | 106/20 X |
| 3,446,647 | 5/1969 | Rizner | 106/24 X |

FOREIGN PATENTS OR APPLICATIONS 902,061   3/1961   United Kingdom.................. 106/22

OTHER PUBLICATIONS

Ellis, Prinking Inks, Reinhold Publishing Corp., N.Y., 1940, (pp. 128 and 454 relied on).

*Primary Examiner*—Theodore Morris
*Attorney, Agent, or Firm*—Sughrue, Rothwell, Mion, Zinn and Macpeak

[57] ABSTRACT

An aqueous printing ink containing perfume-containing microcapsules comprising microcapsules dispersed in an aqueous solution of a polymer which is soluble in water but is less soluble in or swellable with an organic solvent, said microcapsules each containing a single droplet of perfume, being produced by a gelatin-polyanion complex coacervation process, the droplets of perfume having a size of from 15 to 70 microns.

14 Claims, 2 Drawing Figures

PATENTED JUN 10 1975 3,888,689

AQUEOUS PRINTING INK CONTAINING PERFUME-CONTAINING MICROCAPSULES

BACKGROUND OF THE INVENTION

1. Field of the Invention

The instant invention relates to an aqueous printing ink containing an encapsulated perfume and, in particular the invention relates to an aqueous printing ink having printability as well as a fragrance-maintaining property and a fragrant property.

2. Description of the Prior Art

The use of perfume-containing microcapsules is known but the application of the perfume-containing microcapsules to printing ink is accompanied with unexpected difficulties. That is to say, the conventional knowledges of making ink cannot be applied to the case of utilizing the perfume-containing microcapsules in the production of printing ink owing to the necessity of using specific solvents, polymers and binders for making the ink as well as the size of the microcapsules and the requirement of exhibiting effective fragance maintenance and fragrant property.

For instance, if as a solvent for the microcapsule-containing printing ink, conventional oils, alcohols, or petroleum solvents are used as is or as a mixture thereof with water, the encapsulated perfume is dissolved out of the microcapsules and thereby prevent the effective use of the microcapsules. Also, if the amount of binder for the ink is too large, the microcapsules are collapsed during drying or are covered by the binder, which reduces the effect of the perfume-containing microcapsules. Also, the use of a binder or a polymer having an organic solvent property is accompanied with such phenomenon that after printing the fragrance maintenance is greatly damaged. Owing to such various difficulties, printing inks containing perfume-containing microcapsules have not been marketed commercially.

SUMMARY OF THE INVENTION

The present invention provides an aqueous printing ink containing perfume-containing microcapsules, prepared by a process comprising encapsulating single drops of perfume having a size of from 15 to 70 microns by the gelatin-polyanion complex coacervation technique and dispersing the encapsulated perfume in an aqueous solution of a polymer which is watersoluble.

DESCRIPTION OF THE PREFERRED EMBODIMENTS

The aqueous printing ink of this invention shows specific properties in perfume maintenance and fragrance properties and can be used for printing by gravure printing and screen printing.

The features of the instant invention will be decribed below.

Figure 1:
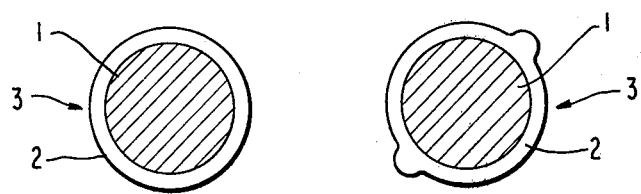
FIGS. 1 and 2 show perfume capsules according to the present invention and outside the scope of the present invention, respectively.

It is known that the fragrance maintenance of a perfume is remarkably increased by encapsulating the perfume. The perfume-containing capsules used in this invention have a size of 20–80 microns and each has a single nucleus structure, i.e., each microcapsule contains one droplet of the perfume oil. This is shown in FIG. 1 of the accompanying drawing, which is a schematic cross sectional view of the perfume-containing microcapsule 3 used in this invention. That is to say, the microcapsule 3 of this invention contains one droplet 1 of perfume oil in a capsule wall 2. Thus, the sizes of the perfume oil droplets to be encapsulated are in a range of 15–70 microns. After printing, the microcapsules are fixedly disposed on the printed matter and when a slight local pressure is applied onto the printed matter by, for instance, rubbing the surface thereof with a nail, the microcapsules at the pressed area are ruptured to release the perfume from the capsules, i.e., to exhibit an "immediate fragrant property."

Figure 2:
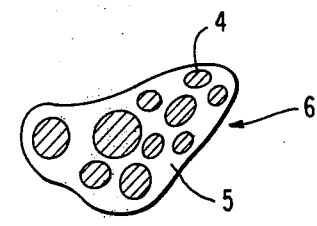

It has been found that if the size of the microcapsule is less than 20 microns (accordingly, the size of the perfume oil droplet is less than 15 microns), the capsules are inferior in the immediate fragrant property although they have good fragrance maintenance. Also, if the size of the microcapsules is larger than 80 microns (accordingly, the size of the perfume oil droplet is larger than 70 microns), the capsules are apt to be readily ruptured even by a very slight pressure, which results in difficulty in piling and handling of the printed matter obtained by using the printing ink containing the microcapsules, although the capsules show good fragrance maintenance and fragrant property. Moreover, it has been found that microcapsules 6 containing in one capsule multiple smaller droplets 4 of perfume oil in wall material 5, as shown in FIG. 2 of the accompanying drawing, may have good perfume maintenance but are not practically used in the point of immediate fragrant property.

From the above knowledge it has been discovered that the size of the microcapsules to be used for the present purpose must be 20–80 microns and accordingly the size of the perfume oil droplets to be encapsulated must be 15–70 microns.

Organic solvents are not used as the solvent for the printing ink of this invention since such organic solvents are mixed with the perfume or dissolve the perfume.

Also, the kind and the amount of the polymer used for the binder in the printing ink of this invention must be sufficiently investigated before use. A perfume is a mixed organic solvent, and hence a polymer which is difficult to be dissolved in or swelled with organic solvents is desirably used. The practical examples of such polymers used as the binder for the printing ink of this invention are water-soluble polymers which can be dissolved in water at a neutral state without the necessity for using an acid or an alkali, for instance, cellulose derivatives such as methyl cellulose, hydroxyethyl cellulose, carboxymethyl cellulose, etc.; polyacrylamide, sodium alginate; gum arabic, polyvinyl alcohol, glue, sodium polyvinylbenzene sulfonate, etc.

The amount of the polymer (dry) to be used must not be over twice the amount of the perfume to be encapsulated. In particular, it is preferable that the amount of the polymer in the whole aqueous printing ink be less than 30%.

The microcapsules prepared by a gelatin-coacervation process have the property of being attached to paper to some extent without a binder. If the amount of the polymer is over twice the amount of the perfume, the perfume-containing microcapsules are deformed and collapsed by the binder during drying of the printed ink and also are covered by the polymer after drying, which reduces the fragrance maintenance and immediate fragrant property of the printing ink or the printed material.

The aqueous printing ink of this invention containing the microcapsules is sufficiently suitable for gravure printing and screen printing in viscosity, extensibility and drying property.

The main features of the instant invention are in the points of (1) the printing ink is an aqueous ink containing perfume-containing microcapsules, which does not dissolve the perfume out of the microcapsules, (2) the size of the microcapsules containing the perfume is 20–80 microns, (3) each of the microcapsules contains one droplet of the perfume, and (4) the amount of the polymer (dry weight) in the printing ink is less than twice the amount of the perfume and the polymer is water soluble and is less soluble in or swellable with organic solvents.

Various methods have been known for producing such perfumecontaining microcapsules but because the coacervation method of using gelatin and polyanionic colloidal materials as the materials for making microcapsules, (which is described in U.S. Pat. No. 2,800,457) is most preferable in production method, adaptability of perfume, and fragrance maintenance, the perfume-containing microcapsules used in this invention are produced by a gelatin coacervation technique.

A general method of producing the aqueous printing ink of this invention containing perfume-containing capsules will be first explained below. A perfume alone or diluted by an oil is emulsified in an aqueous gelatin solution and the sizes of the emulsified oil drops are adjusted to 15–70 microns, preferably 15–40 microns. Then, a polyanionic colloid is added to the emulsion and microcapsules, each containing a single oil drop therein and having a size of 15–70 microns, are formed by gelatin coacervation in accordance with an ordinary manner. After finishing a hardening treatment, the microcapsules are collected and a dense slurry of the microcapsules is prepared. On the other hand, an aqueous solution of a water soluble polymer which is not soluble in organic solvents is prepared and a suitable amount of the aqueous solution is mixed with the slurry prepared above to provide an ink. The microcapsules containing the perfume oil prepared above may be added to the aqueous polymer solution after being dried and solidified by a spray drying method in place of adding them as a slurry thereof. The use of a polymer having a high viscosity is preferable because the aqueous printing ink having good printability is obtained by using a low-concentration aqueous solution of the polymer. The aqueous polymer solution may be colored by preliminarily adding thereto a dye or a pigment, but the addition thereof is not limited to the aqueous printing ink. Accordingly, the dye or pigment is not especially limited.

When a print obtained by printing a pattern with the aqueous printing ink of this invention was rubbed locally one year after printing, a fresh immediate fragrance was obtained.

EXAMPLE 1

Perfume-containing microcapsules were prepared by the following manner. 1.32 g of a jasmine oil was dispersed by emulsification in 2 liters of water containing an emulsifier into sizes of 30 microns by means of a homomixer. After stabilizing the emulsification of the dispersion by adding 1.2 kg of a 10% aqueous solution of gum arabic, the dispersion was re-dispersed in 8.9 liters of an aqueous 1.35% gelatin solution. When the pH of the system was adjusted to 4.5 with 10% acetic acid under stirring while maintaining the temperature of the system at 40°C, coacervate drops each containing one droplet of the perfume were formed. Thereafter, while continuing the stirring, the temperature of the system was reduced to 10°C to set the coacervate particles and then 25% glutaraldehyde was added to the system to cure or harden the films of the coacervates to obtain single nucleus type microcapsules having a size of 30–40 microns. By filtering the system, 3 kg of a capsule-containing slurry was obtained.

As an aqueous medium, 1.1 parts of a 1.5% aqueous solution of highly viscous methyl cellulose, Metorose 60 SH-400 (trade name made by Shinetsu Kagaku Kogyo K.K.) was added to 2 parts of the capsule slurry and the microcapsules were sufficiently dispersed therein to provide an aqueous ink containing the perfume-containing microcapsules. The viscosity of the aqueous ink obtained was 30 seconds in Zahn Cup No. 3. By using the aqueous ink, a spot printing was conducted by means of a gravure printing machine. When the spots of the print obtained were ruptured by fingers, the fragrance of the jasmine was released.

EXAMPLE 2

A slurry of white rose-containing microcapsules was prepared by the same procedure as in Example 1 and by mixing 2 parts of the capsule slurry and 1.4 parts of 35% polyvinyl alcohol (Poval 203) an aqueous printing ink was obtained.

EXAMPLE 3

A slurry of orange oil-containing microcapsules was prepared by the same manner as in Example 1 and by mixing 2 parts of the capsule slurry and 1.5 parts of a 1% aqueous solution of potassium polyvinylbenzene sulfonate, an aqueous printing ink of this invention was prepared and by using the aqueous ink, screen printing was conducted.

What is claimed is:

1. An aqueous phase comprising a printing ink containing perfumecontaining microcapsules comprising microcapsules dispersed in an aqueous solution of a polymer which is soluble in water but is less soluble in or swellable with an organic solvent, said microcapsules, each containing a single droplet of perfume and being produced by a conventional gelatin-polyanion complex coacervation process, the droplets of perfume having a size of from 15 to 70 microns and the amount of polymer, when dry, being less than twice the amount of the perfume, the polymer being one which does not deteriorate the gelatin-polyanion colloid coacervate of the microcapsules, wherein the aqueous phase contains a colored dye or pigment and the water soluble polymer dissolved therein and the perfume containing microcapsules.

2. The aqueous printing ink of claim 1 wherein the size of said perfume-containing microcapsules is from 20 to 80 microns.

3. The aqueous printing ink of claim 1 wherein said polymer is methyl cellulose, hydroxyethyl cellulose, carboxymethyl cellulose, polyacrylamide, sodium alginate, gum arabic, polyvinyl alcohol, glue or sodium polyvinylbenzene sulfonate.

4. A process for producing an aqueous printing ink containing perfume-containing microcapsules comprising encapsulating single drops of perfume by a conventional gelatin-polyanion complex coacervation process and dispersing the resulting capsules in an aqueous solution of a polymer which is soluble in water but less soluble in or swelled by an organic solvent and the amount of polymer, when dry, being less than twice the amount of the perfume, the polymer being one which does not deteriorate the gelatin-polyanion colloid coacervate of the microcapsules.

5. The process of claim 4 wherein the droplets of perfume have a size of from 15 to 70 microns.

6. The process of claim 4 wherein the size of the perfume-containing microcapsules is from 20 to 80 microns.

7. The process of claim 4 wherein said polymer is methyl cellulose, hydroxyethyl cellulose, carboxymethyl cellulose, polyacrylamide, sodium alginate, gum arabic, polyvinyl alcohol, glue or sodium polyvinylbenzene sulfonate.

8. The aqueous printing ink of claim 1 wherein the polymer is one which is dissolved in water in the neutral state.

9. The aqueous printing ink of claim 1 wherein the amount of polymer in the aqueous ink is less than 30% of the amount of perfume microencapsulated.

10. The aqueous printing ink of claim 1 where the droplets of perfume have a size of from 15 to 40 microns.

11. The aqueous printing ink of claim 1 where the polymer is water soluble but less soluble in or swellable in an organic solvent and the gelatin-polyanion complex resulting from the coacervation is water insoluble, the aqueous printing ink being substantially free of organic solvents other than the perfume.

12. The aqueous printing ink of claim 11 where the perfume is a mixed organic solvent.

13. The aqueous printing ink of claim 11 where the polymer serves as a binder for the microcapsules.

14. The aqueous printing ink of claim 12 where the perfume is diluted by an oil different from the perfume.

* * * * *